March 7, 1950      A. N. MILSTER      2,499,667
RECORDING DECELEROMETER
Filed May 3, 1945
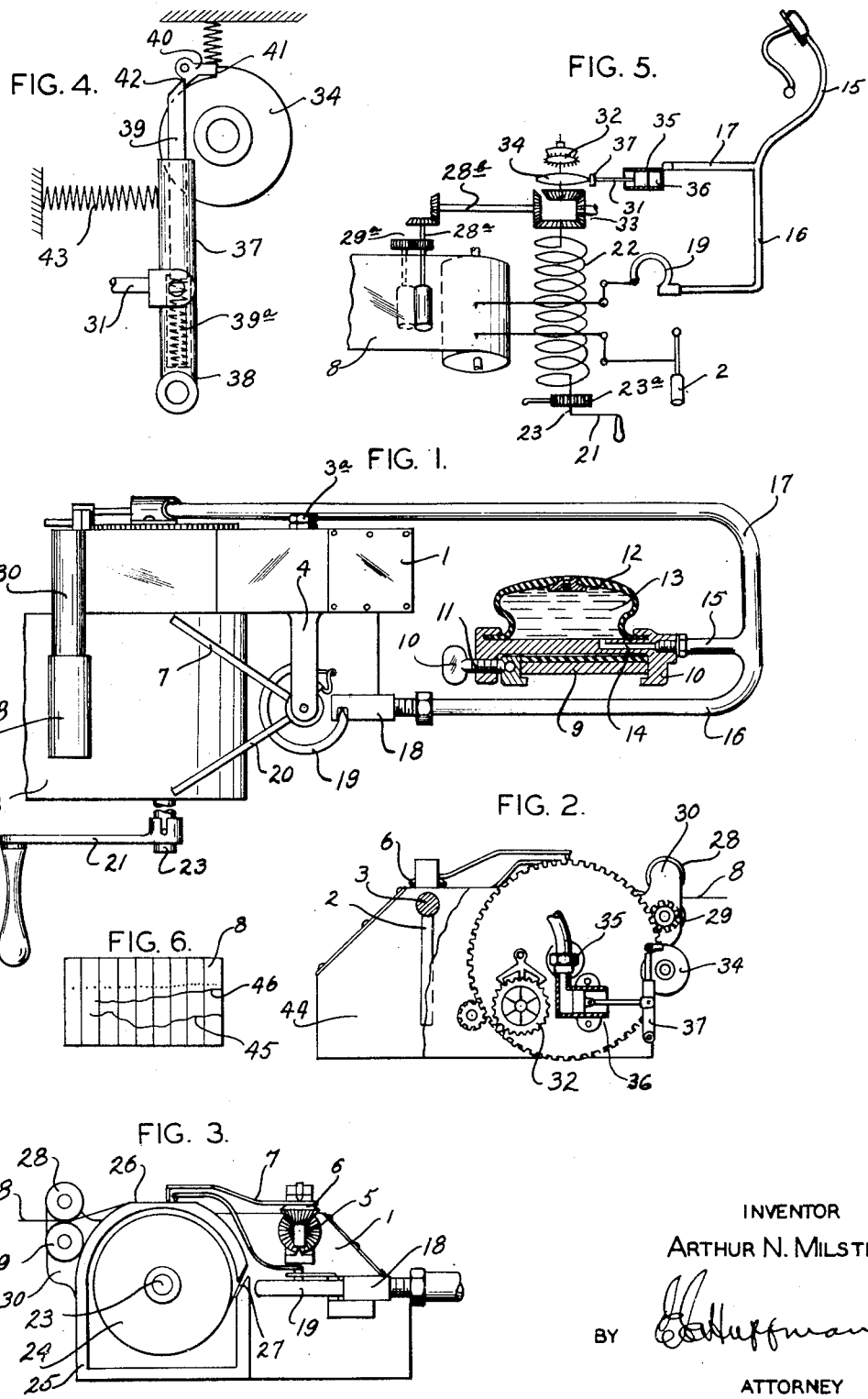
INVENTOR
ARTHUR N. MILSTER
BY *Huffman*
ATTORNEY Patented Mar. 7, 1950

2,499,667

UNITED STATES PATENT OFFICE 2,499,667

RECORDING DECELEROMETER

Arthur N. Milster, Ferguson, Mo., assignor to Wagner Electric Corporation, St. Louis, Mo., a corporation of Delaware Application May 3, 1945, Serial No. 591,806

7 Claims. (Cl. 346—112)

This invention relates to recording stop meters or decelerometers and in its more specific aspects is directed to a meter for recording the deceleration rates of a self-propelled vehicle and the brake pedal pressure employed.

One of the objects of the invention is to provide a recording device in a stop meter or decelerometer which is capable of making a permanent record of the deceleration rates of a vehicle and the pedal pressure applied to the brake pedal during the test.

Another object of this invention is to provide an inertia responsive mechanism which simultaneously records on the same chart the deceleration corresponding to the recorded pedal pressure employed to effect the stop.

A further object of the invention is to provide a decelerometer having a spring motor operated recording chart thereon upon which the record of the pedal pressure employed in effecting the stop is scribed.

A still further object of the invention is to provide a decelerometer having a pressure responsive device therein for initiating the operation of a spring motor which uniformly drives the chart upon which the data are recorded.

Another and still further object of the invention is to provide a decelerometer having a self-contained power unit to drive a recording chart upon which the deceleration characteristics of the vehicle under test and the pedal pressure employed are recorded.

Other and further objects of the invention will occur to those skilled in the art to which this application pertains as the description proceeds, which, taken in connection with the accompanying drawings, sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In the drawings:

Figure 1 shows a plan view of the recording decelerometer;

Figure 2 shows an elevational view of one side of the recording decelerometer;

Figure 3 shows an elevational view of the other side of the recording decelerometer;

Figure 4 is an enlarged view of the detent mechanism;

Figure 5 shows a schematic illustration of the transmission means; and

Figure 6 shows a sample record sheet.

The running of brake tests on self-propelled vehicles and the making of records of such tests, copies of which can be supplied to the vehicle operators, is an expedient that has been desired in the art for a considerable length of time and various devices have been developed for making such records. Several of the art devices are capable of recording and measuring the distance necessary to stop a vehicle from a predetermined speed or the time necessary to make such tests as well as recording the speed at each point of the stopping distance. The stopping efficiency of any brake equipment on self-propelled vehicles is a direct function of the brake pressure employed and the brake pressure being a function of the pedal pressure, it is desirable that some means be provided for recording the pedal pressure such that better comparisons may be made in tests on the same or different vehicles. Various art devices depend for their operation upon a connection with the power unit in the vehicle or upon the movement of a trailer device to operate various of the mechanisms. The instant device is a portable self-contained unit having its own source of power for operating the recording mechanism and it is operatively associated with different parts of the vehicle under test such that an over-all picture of the braking efficiency of the vehicle may be made.

The objects and advantages set forth above are embodied in a device which originates in a housing 1 that may be filled with a suitable damping medium such as an alcohol or hydraulic brake fluid. The rate of speed change responsive element in the device originates in a pendulum device 2 secured to a shaft 3 appropriately pivoted in the housing and secured therein by nuts 3a with the pendulum suspended in the aforementioned fluid. A bracket 4 secured to the housing supports a gear mechanism, one part of which is a beveled gear 5 secured to shaft 3 that meshes with a second beveled gear 6 rotatably mounted on the end of bracket 4 and an arm 7 operably secured to the gear 6 having having a suitable scriber or stylus thereon adapted to scribe a record sheet 8 arranged on a reel within housing 1. It is evident from the foregoing that when housing 1 is placed in or on a moving vehicle in which the line of movement is at right angles to the axis of shaft 3, during deceleration of the vehicle the pendulum 2 will swing about shaft 3 as an axis to move arm 7 across the record sheet 8 and, therefore, record the rates of deceleration of the vehicle or moving body under test during all time elements of the stopping period.

A record of the pedal pressures employed in effecting a stopping of a vehicle under test is also made by the device. In automotive type vehicles an attachment is secured to the brake pedal, a portion of which is shown at 9 to which a housing 10 is secured by an appropriate screw and slide means 11. Fixed to the housing is a flexible member 12 which forms a chamber 13 with the housing 10 filled with an appropriate fluid. The housing 10 has a duct 14 formed therein to which a conduit or other tubular connection 15 is secured which branches out into conduits 16 and 17. Conduit 16 leads to a fixture 18 operatively connected with a Bourdon spring 19 having an arm 20 associated therewith provided with a suitable scribing element or stylus to scribe the record sheet 8 in the same manner as arm 7. This attachment enables the operator to determine the exact pedal pressures employed during the course of the test and affords a more accurate comparison of the tests of the same or similar vehicles.

The driving means for the operating mechanism of the recording decelerometer originates in a spring motor 22 schematically illustrated in Figure 5 but contained within housing 1. The spring motor is wound by means of a shaft 23 to which a crank 21 is removably secured to wind spring 22. Shaft 23 also constitutes the support for a reel of paper 24 disposed within a housing 25 associated with housing 1 and forming a part thereof. The reel 24 for paper strip 8 is loosely received on shaft 23 and is not driven thereby. The housing portion 25 is partially semi-cylindrical in shape and has a flattened exterior surface as at 26 over which the strip 8 is led through slot 27 after the paper is withdrawn from reel 24. A ratchet device 23a associated with shaft 23 prevents the unwinding of spring 22. This ratchet is associated with shaft 23 in a manner such that reel 24 may be held thereon.

Paper strip 8 is withdrawn from reel 24 by feed rollers 28, 29 each of which are secured to shafts 28a, 29a that are connected to the output side of spring motor 22 through a suitable gear transmission 28b. The shaft elements 28a, 29a are rotatably supported in a bracket 30 secured to housing 1. The gearing connecting shafts 28a and 29a is suitably proportioned such that rollers 28, 29 will be driven at an appropriately timed speed.

Means are also provided in housing 1 to limit the number of times the feed rollers 28, 29 may rotate in order that the total length of strip 8 withdrawn from reel 24 will always be uniform regardless of the length of time required for the brake application. This uniform length of chart facilitates handling and filing of records and is selective to accommodate conditions. These means which are associated with the output side of spring motor 22 constitute a gear set 33 which drives a one-revolution cam 34. Regulating the power supply to cam 34 and motor 22 is an escapement 32 which provides that the paper strip 8 will pass the styli on arms 7 and 20 at a uniform rate of speed. This escapement is of a well-known type such as employed in time pieces or a centrifugal governor could also be employed such as is found in phonograph motors likewise well known to the art.

The means for releasing cam 34 to enable the feed rollers 28, 29 to begin operating comprises a piston cylinder device 36 having a fitting 35 thereon to which conduit 17 is secured. Piston rod 31 of the piston cylinder device 36 is connected to a control mechanism operably associated with cam 34. When pressure fluid from chamber 13 is applied to the piston cylinder device 36, the cam will be released for rotation.

The device 37 for limiting the rotation of cam 34 to a single rotation originates in a spring-pressed pivoted ratchet lever 40 that engages the peripheral offset 41 in cam 34. When pressure fluid is applied to piston cylinder device 36, device 37 is pivoted, thereby releasing lever 40 and allowing cam 34 to rotate counter-clockwise as shown in Figure 4. When the cam returns to the position shown in Figure 4, the ratchet lever 40 will again engage offset 41 to stop the rotation of the cam.

The device 37 comprises a pivoted lever 38 to which rod 31 is appropriately secured. A plunger 39 engages with a projection 42 on ratchet 40 to rotate lever 40 when rod 31 is moved to pivot lever 38 clockwise. The plunger 39 will snap past projection 42 when rod 38 is pivoted counter-clockwise when pressure fluid is withdrawn from piston cylinder 36. A spring 43 will cause said withdrawal of lever 38 to the Figure 4 position. Since plunger 39 is spring-pressed in lever 38 by means of a spring 39a, plunger 39 will ride over projection 42 to the Figure 4 position, thus readying it for the next test.

Assume that the device is located in the vehicle to be tested and that the vehicle is set in motion. The brakes are now energized by applying pressure to the brake pedal. Fluid pressure from pad 12 will release cam 34 permitting the spring motor to begin the withdrawal of chart 8 from roll 24. Simultaneously the amount of pressure applied to the brake pedal will be recorded by means of appropriate connections to Bourdon spring 19, arm 20 carrying a suitable stylus, and instantaneous values of the rate of speed change will be recorded by arm 7 actuated by pendulum 2. The arc of swing of pendulum 2 is proportional to the deceleration of the vehicle.

The rate of withdrawal of the paper from the roll is governed at a fixed uniform rate of speed and appropriate lines indicating the time interval may, therefore, be previously ruled thereon. A graphic record of deceleration against time intervals is thus obtained from which the stopping distance of the vehicle may be determined.

Figure 6 shows a sample record sheet. The length of the graphs scribed by the styli is a measure of the time required to complete a braking application.

Having fully described my invention, that which I claim as novel and desire to protect by Letters Patent of the United States is:

1. A recording decelerometer, to measure deceleration of a vehicle provided with a brake pedal and to measure the pressure applied to said brake pedal, comprising an inertia responsive device; a spring motor; means to support a roll of record sheet material; means operable by said spring motor to withdraw record sheet material from said roll; sheet marking means operatively associated with said inertia responsive device and said pressure responsive device to mark the record sheet to record vehicle deceleration and pedal pressure; a container for fluid associated with the brake pedal of the vehicle under test, the fluid being under pressure when the pedal is depressed; pressure responsive means operable by the pressure fluid derived from said container to release said spring motor for operation; and means to limit the operation of said motor so that the strips withdrawn from the roll will be of uniform and constant width.

2. A recording decelerometer, to measure deceleration time of a vehicle provided with a brake pedal, comprising an inertia responsive device; a spring motor; means to support a roll of record sheet material; means operable by said spring motor to withdraw record sheet material from said roll; sheet marking means operatively associated with said inertia responsive device to mark the record sheet to record vehicle deceleration; a container for fluid associated with the brake pedal of the vehicle under test, the fluid being under pressure when the pedal is depressed; pressure responsive means operable by the pressure fluid derived from said container to release said spring motor for operation; and means to limit the operation of said motor so that the strips withdrawn from the roll will be of uniform and constant length.

3. A recording decelerometer having means therein to record the pressure applied to the brake pedal of a vehicle and to record the normal deceleration of said vehicle, comprising a spring motor; means to support a roll of record sheet material; means operable by said spring motor to withdraw record sheet material from said roll; sheet marking means operatively associated with said record sheet; a container for fluid associated with the brake pedal of the vehicle under test, the fluid being under pressure when the pedal is depressed; pressure fluid operated means to operate said sheet marking means; means establishing communication between said pressure fluid source and said pressure fluid operated means for said marking means; pressure responsive means operable by pressure fluid derived from said container to release said spring motor for operation; and means to limit the operation of said motor so that the strips withdrawn from the roll will be of uniform and constant length.

4. A recording decelerometer, to measure deceleration of a vehicle provided with a brake pedal, comprising a housing; an inertia responsive device in said housing; a spring motor in said housing; means to support a roll of record sheet material in said housing; means operable by said spring motor to withdraw record sheet material from said roll; scribing means operatively connected with said inertia responsive device to record deceleration; a container for fluid associated with the brake pedal of the vehicle tested, the fluid being under pressure when the pedal is depressed; pressure responsive means operable by pressure fluid derived from said container to release said spring motor for operation; means to limit the operation of said motor so that the strips unrolled will be of uniform and constant length; and means to cause said strip to be drawn from said roll at a uniform rate of speed.

5. A recording decelerometer having means therein to record the deceleration of a vehicle and to record the pressure applied to the brake pedal of the vehicle tested, comprising a housing; a spring motor in said housing; means to support a roll of record sheet material in said housing; means operable by said spring motor to withdraw record sheet material from said roll; scribing means operatively associated with said roll of record sheet material; pressure fluid operated means to operate said scribing means; a container for fluid associated with the brake pedal, said fluid being under pressure when the brake pedal is depressed; means to establish communication between said pressure fluid operating means for said scribing means and said container; pressure responsive means operable by pressure fluid derived from said container to release said spring motor for operation; means to limit the operation of said motor so that the strips withdrawn from the roll will be of uniform and constant length; and means to cause said strips to be drawn from said roll at a uniform rate of speed.

6. A recording decelerometer, to measure deceleration of a vehicle provided with a brake pedal, comprising a housing; an inertia means in said housing responsive to vehicle deceleration; a spring motor in said housing; means to support a roll of record sheet in said housing; means operable by said spring motor to unroll strip material from said roll; a container for fluid securable to the brake pedal of the vehicle under test, the fluid in said container placed under pressure when the pedal is depressed; a scriber operatively associated with said inertia device to scribe the record sheet withdrawn from said roll to record vehicle deceleration; a one-revolution cam to limit the operation of said spring motor; means to regulate the speed of said spring motor; and pressure fluid means operated by pressure fluid derived from said container and associated with said cam to release said spring motor to permit its operation.

7. A recording decelerometer, to measure deceleration of a vehicle provided with a brake pedal, comprising a housing; an inertia means in said housing responsive to vehicle deceleration; a spring motor in said housing; means to support a roll of record sheet in said housing; means operable by said spring motor to unroll strip material from said roll; a container for fluid securable to the brake pedal of the vehicle under test, the fluid in said container placed under pressure when the pedal is depressed; a scriber operatively associated with said inertia device to record the deceleration of the vehicle on the sheet withdrawn from said roll; a scriber to record the pressure applied to said pedal; means to establish communication between said container and said second scriber; a one-revolution cam to limit the operation of said spring motor; means to regulate the speed of said spring motor; and pressure fluid means operatively associated with said container and said cam to initiate operation of said spring motor.

ARTHUR N. MILSTER.

REFERENCES CITED

The following references are of record in the file of this patent:

UNITED STATES PATENTS

| Number | Name | Date |
|---|---|---|
| 484,411 | De Forest | Oct. 18, 1892 |
| 581,965 | Terry | May 4, 1897 |
| 679,791 | Stockel | Aug. 6, 1901 |
| 683,703 | Nindeman | Oct. 1, 1901 |
| 951,658 | Phillips | Mar. 8, 1910 |
| 1,265,156 | Young | May 7, 1918 |
| 1,399,032 | Sperry | Dec. 6, 1921 |
| 1,404,422 | Barr et al. | Jan. 24, 1922 |
| 1,404,770 | Hopkins | Jan. 31, 1922 |
| 1,413,771 | Pampinella | Apr. 25, 1922 |
| 1,872,495 | Pfeiffer | Aug. 16, 1932 |
| 2,038,021 | Zand | Apr. 21, 1936 |
| 2,199,672 | Peterson | May 7, 1940 |